United States Patent [19]
Shih

[11] Patent Number: 6,122,296
[45] Date of Patent: Sep. 19, 2000

[54] MULTIPLEXER UTILIZING VARIABLE RESISTANCE, ANALOG-TO DIGITAL CONVERSION, AND/OR DIGITAL-TO-ANALOG CONVERSION

[76] Inventor: Kelvin Shih, 908 Devonshire Blvd., Brighton, Mich. 48116

[21] Appl. No.: 08/960,989

[22] Filed: Oct. 30, 1997

[51] Int. Cl.[7] .................................................. H04K 17/62
[52] U.S. Cl. ........................................... 370/532; 327/407
[58] Field of Search .................................... 370/532, 533, 370/534, 535, 537, 546, 465, 466; 327/407; 341/99, 155

[56] References Cited

U.S. PATENT DOCUMENTS

| | | | |
|---|---|---|---|
| 4,811,017 | 3/1989 | Gulczynski | 341/145 |
| 4,876,502 | 10/1989 | Verbanets et al. | 324/115 |

*Primary Examiner*—Ricky Ngo
*Assistant Examiner*—Kwang B. Yao
*Attorney, Agent, or Firm*—Fildes & Outland, P.C.

[57] ABSTRACT

A variable resistor/bar graph driver multiplexer uses a resistor network for obtaining a variable resistance and a constant current source. The resistor network contains a plurality of switches such that each switch corresponds with a particular resistor when depressed, thereby providing one of a plurality of output voltages. The output voltage is received by a receiver containing a bar graph driver circuit and a plurality of PNP drivers and relay coils corresponding to the switches at the transmitter. The relay coils will turn on depending on the switch pushed at the transmitter. This multiplexer circuit allows a large amount of switch position information and multiple to be transmitted over only two signal lines rather than the large number of lines used in conventional multiplexers. The multiplexer circuit can also be implemented using analog-to-digital converters and digital-to-analog converters at the receiver.

6 Claims, 9 Drawing Sheets

| | A | B | C | D | E | F | G | H | I | J | K | L | M |
|---|---|---|---|---|---|---|---|---|---|---|---|---|---|
| 1 | Weight | Rx | pulse width | 128 | 64 | 32 | 16 | 8 | 4 | 2 | 1 | N | on |
| 2 | SW0 | 500 | 5.50e-5 | 0 | 0 | 0 | 0 | 0 | 0 | 0 | 0 | 8 | S0 |
| 3 | SW1 | 1500 | 1.65e-4 | 0 | 0 | 0 | 1 | 1 | 0 | 0 | 0 | 24 | S1 |
| 4 | SW2 | 2500 | 2.75e-4 | 0 | 0 | 1 | 0 | 1 | 0 | 0 | 0 | 40 | S2 |
| 5 | SW3 | 3500 | 3.85e-4 | 0 | 0 | 1 | 1 | 1 | 0 | 0 | 0 | 56 | S3 |
| 6 | SW4 | 4500 | 4.95e-4 | 0 | 1 | 0 | 0 | 1 | 0 | 0 | 0 | 72 | S4 |
| 7 | SW5 | 5500 | 6.05e-4 | 0 | 1 | 0 | 1 | 1 | 0 | 0 | 0 | 88 | S5 |
| 8 | SW6 | 6500 | 7.15e-4 | 0 | 1 | 1 | 0 | 1 | 0 | 0 | 0 | 104 | S6 |
| 9 | SW7 | 7500 | 8.25e-4 | 0 | 1 | 1 | 1 | 1 | 0 | 0 | 0 | 120 | S7 |
| 10 | SW8 | 8500 | 9.35e-4 | 1 | 0 | 0 | 0 | 1 | 0 | 0 | 0 | 136 | S8 |
| 11 | SW9 | 9500 | 1.04e-3 | 1 | 0 | 0 | 1 | 1 | 0 | 0 | 0 | 152 | S9 |
| 12 | SW10 | 10500 | 1.15e-3 | 1 | 0 | 1 | 0 | 1 | 0 | 0 | 0 | 168 | S10 |
| 13 | SW11 | 11500 | 1.26e-3 | 1 | 0 | 1 | 1 | 1 | 0 | 0 | 0 | 184 | S11 |
| 14 | SW12 | 12500 | 1.37e-3 | 1 | 1 | 0 | 0 | 1 | 0 | 0 | 0 | 200 | S12 |
| 15 | SW13 | 13500 | 1.48e-3 | 1 | 1 | 0 | 1 | 1 | 0 | 0 | 0 | 216 | S13 |
| 16 | SW14 | 14500 | 1.59e-3 | 1 | 1 | 1 | 0 | 1 | 0 | 0 | 0 | 232 | S14 |
| 17 | open | 15500 | 1.70e-3 | 1 | 1 | 1 | 1 | 1 | 0 | 0 | 0 | 248 | S15 |

|   | A | B | C | D | E | F | G | H | I | J | K | L | M |
|---|---|---|---|---|---|---|---|---|---|---|---|---|---|
| 1 | Weight | Rx | pulse width | N | 128 | 64 | 32 | 16 | 8 | 4 | 2 | 1 | on |
| 2 | SW0 | 500 | 0.16 | 7 | 0 | 0 | 0 | 0 | 0 | 1 | 1 | 1 | X0 |
| 3 | SW1 | 1500 | 0.47 | 23 | 0 | 0 | 0 | 1 | 0 | 1 | 1 | 1 | X1 |
| 4 | SW2 | 2500 | 0.78 | 39 | 0 | 0 | 1 | 0 | 0 | 1 | 1 | 1 | X2 |
| 5 | SW3 | 3500 | 1.09 | 55 | 0 | 0 | 1 | 1 | 0 | 1 | 1 | 1 | X3 |
| 6 | SW4 | 4500 | 1.40 | 71 | 0 | 1 | 0 | 0 | 0 | 1 | 1 | 1 | X4 |
| 7 | SW5 | 5500 | 1.72 | 87 | 0 | 1 | 0 | 1 | 0 | 1 | 1 | 1 | X5 |
| 8 | SW6 | 6500 | 2.03 | 103 | 0 | 1 | 1 | 0 | 0 | 1 | 1 | 1 | X6 |
| 9 | SW7 | 7500 | 2.34 | 119 | 0 | 1 | 1 | 1 | 0 | 1 | 1 | 1 | X7 |
| 10 | SW8 | 8500 | 2.65 | 135 | 1 | 0 | 0 | 0 | 0 | 1 | 1 | 1 | X8 |
| 11 | SW9 | 9500 | 2.96 | 151 | 1 | 0 | 0 | 1 | 0 | 1 | 1 | 1 | X9 |
| 12 | SW10 | 10500 | 3.28 | 167 | 1 | 0 | 1 | 0 | 0 | 1 | 1 | 1 | X10 |
| 13 | SW11 | 11500 | 3.59 | 182 | 1 | 0 | 1 | 1 | 0 | 1 | 1 | 0 | X11 |
| 14 | SW12 | 12500 | 3.90 | 198 | 1 | 1 | 0 | 0 | 0 | 1 | 1 | 0 | X12 |
| 15 | SW13 | 13500 | 4.21 | 214 | 1 | 1 | 0 | 1 | 0 | 1 | 1 | 0 | X13 |
| 16 | SW14 | 14500 | 4.52 | 230 | 1 | 1 | 1 | 0 | 0 | 1 | 1 | 0 | X14 |
| 17 | open | 15500 | 4.84 | 246 | 1 | 1 | 1 | 1 | 0 | 1 | 1 | 0 | X15 |

Fig.8

|   | A | B | C | D | E | F | G | H | I | J | K | L | M |
|---|---|---|---|---|---|---|---|---|---|---|---|---|---|
| 1 | Weight | Rx | Vin | N | 128 | 64 | 32 | 16 | 8 | 4 | 2 | 1 | high |
| 2 | SW0 | 500 | 0.16 | 7 | 0 | 0 | 0 | 0 | 0 | 1 | 1 | 1 | S0 |
| 3 | SW1 | 1500 | 0.47 | 23 | 0 | 0 | 0 | 1 | 0 | 1 | 1 | 1 | S1 |
| 4 | SW2 | 2500 | 0.78 | 39 | 0 | 0 | 1 | 0 | 0 | 1 | 1 | 1 | S2 |
| 5 | SW3 | 3500 | 1.09 | 55 | 0 | 0 | 1 | 1 | 0 | 1 | 1 | 1 | S3 |
| 6 | SW4 | 4500 | 1.40 | 71 | 0 | 1 | 0 | 0 | 0 | 1 | 1 | 1 | S4 |
| 7 | SW5 | 5500 | 1.72 | 87 | 0 | 1 | 0 | 1 | 0 | 1 | 1 | 1 | S5 |
| 8 | SW6 | 6500 | 2.03 | 103 | 0 | 1 | 1 | 0 | 0 | 1 | 1 | 1 | S6 |
| 9 | SW7 | 7500 | 2.34 | 119 | 0 | 1 | 1 | 1 | 0 | 1 | 1 | 1 | S7 |
| 10 | SW8 | 8500 | 2.65 | 135 | 1 | 0 | 0 | 0 | 0 | 1 | 1 | 1 | S8 |
| 11 | SW9 | 9500 | 2.96 | 151 | 1 | 0 | 0 | 1 | 0 | 1 | 1 | 1 | S9 |
| 12 | SW10 | 10500 | 3.28 | 167 | 1 | 0 | 1 | 0 | 0 | 1 | 1 | 1 | S10 |
| 13 | SW11 | 11500 | 3.59 | 182 | 1 | 0 | 1 | 1 | 0 | 1 | 1 | 0 | S11 |
| 14 | SW12 | 12500 | 3.90 | 198 | 1 | 1 | 0 | 0 | 0 | 1 | 1 | 0 | S12 |
| 15 | SW13 | 13500 | 4.21 | 214 | 1 | 1 | 0 | 1 | 0 | 1 | 1 | 0 | S13 |
| 16 | SW14 | 14500 | 4.52 | 230 | 1 | 1 | 1 | 0 | 0 | 1 | 1 | 0 | S14 |
| 17 | open | 15500 | 4.84 | 246 | 1 | 1 | 1 | 1 | 0 | 1 | 1 | 0 | S15 |

Fig.9

MULTIPLEXER UTILIZING VARIABLE RESISTANCE, ANALOG-TO DIGITAL CONVERSION, AND/OR DIGITAL-TO-ANALOG CONVERSION

TECHNICAL FIELD

This invention relates to a multiplexer using variable resistance along with a bar graph driver, an analog-to-digital converter and/or a digital-to-analog converter to send large amounts of switch position information over a limited number of signal lines.

BACKGROUND OF THE INVENTION

Multiplexing has been used since the days of Thomas Edison to transmit multiple signals on a limited number of wires. Because of the advances in the electronics in recent years and the increasing importance of information transmission, multiplexing schemes are widely used in many industries. For example, telephone companies multiplex multiple voice or transmission signals to transmit greater amounts of information without increasing the number of cables being used. Many jet fighters routinely use multiplexing to transmit large amounts of data from one area of the airplane to another.

The recent advances in network technology further demonstrate the importance of using multiplexing to optimize information transmission over a limited number of wires or optical cables. Most multiplexers in use today multiplex signals using time division multiplexing. In this method, time slots are divided such that each data channel occupies multiple signals, thereby allowing multiple signals to be transmitted over only one pair of wires. Although time division multiplexing enables transmission of large amounts of information in one pair of wires, the implementation of this type of multiplexing is very costly, making multiplexing too expensive for widespread use.

SUMMARY OF THE INVENTION

It is therefore an object of the invention to provide a simple, efficient, and low-cost multiplexing system that can handle the needs of on/off control or motor direction control in a large number of technological applications.

Accordingly, the multiplexing system of the invention uses a large number of switches to control the resistance value of a variable resistor in a transmitter, such as a resistor tree. The resistance value is used in conjunction with a constant current source to generate an output voltage that is proportional to the variable resistor. This output voltage is used to communicate with a receiver circuit to select a particular relay or MOSFET switch to energize. In a different embodiment, the variable resistor is used to generate a one-shot pulse having a pulse width that is directly proportional to the resistance value. By measuring the pulse width, the receiver can determine which particular channel should be energized.

The multiplexing system described in detail below normally turns one channel at a time. If more than one channel needs to be controlled, however, a toggle-type flip-flop can be used in the receiver circuit to convert the momentary contact switch in the transmitter circuit to a push-on/push-off switch in the receiver. However, for many applications, such as controlling power seats, power windows, and power mirrors in an automobile, only one single channel is energized at any given time, making the multiplexing system described below more than adequate for most applications.

Further, the transmitter used in the invention is preferably a group of transistors with many switches to control the value of the variable resistor. Because of this structure, only two wires needed between the transmitter and receiver circuit. Since switches are needed in most applications, regardless of whether a multiplexing system is used or not, the transmitter is basically a resistor tree on a printed circuit board. This means a much lower cost than using a Universal Asynchronous Receiver and Transmitter ("UART").

Note that in a non-muliplexed wiring system, all the switches used for controlling a load must be able to carry load current, and in the case of a DC motor, stall current as well. This type of system requires many high-current carrying switches, increasing the overall cost of the system. In a multiplexed system like the present invention, by contrast, the switches are only used to indicate which channel needs to be energized and thus carries a very small amount of current, on the order of a few hundred micro-amperes. Thus, inexpensive, low current-carrying switches, such as calculator keypad switches, can be used.

Another advantage of using this type of simple multiplexing system is the simplification of the wiring harness and its associated connectors. By replacing the fifteen channels with two wires and thirty channels with three wires, the wire harness can be simplified dramatically and congestion problems at key locations can be resolved.

Both the receiver and transmitter circuit in this multiplexing system contain easily available everyday electronic components instead of more costly UARTs or microprocessors. Another advantage of such a simple multiplexing system is during the manufacturing stage and, later on, the repair stage because only a resistor substitution box having the correct number of switches is needed. No special microprocessor-based or computer-controlled equipment is required to test the multiplexing system of the invention.

Further objects and advantages will become apparent after consideration of the ensuing description and accompanying drawings.

DETAILED DESCRIPTION OF THE PREFERRED EMBODIMENTS

Figure 1:
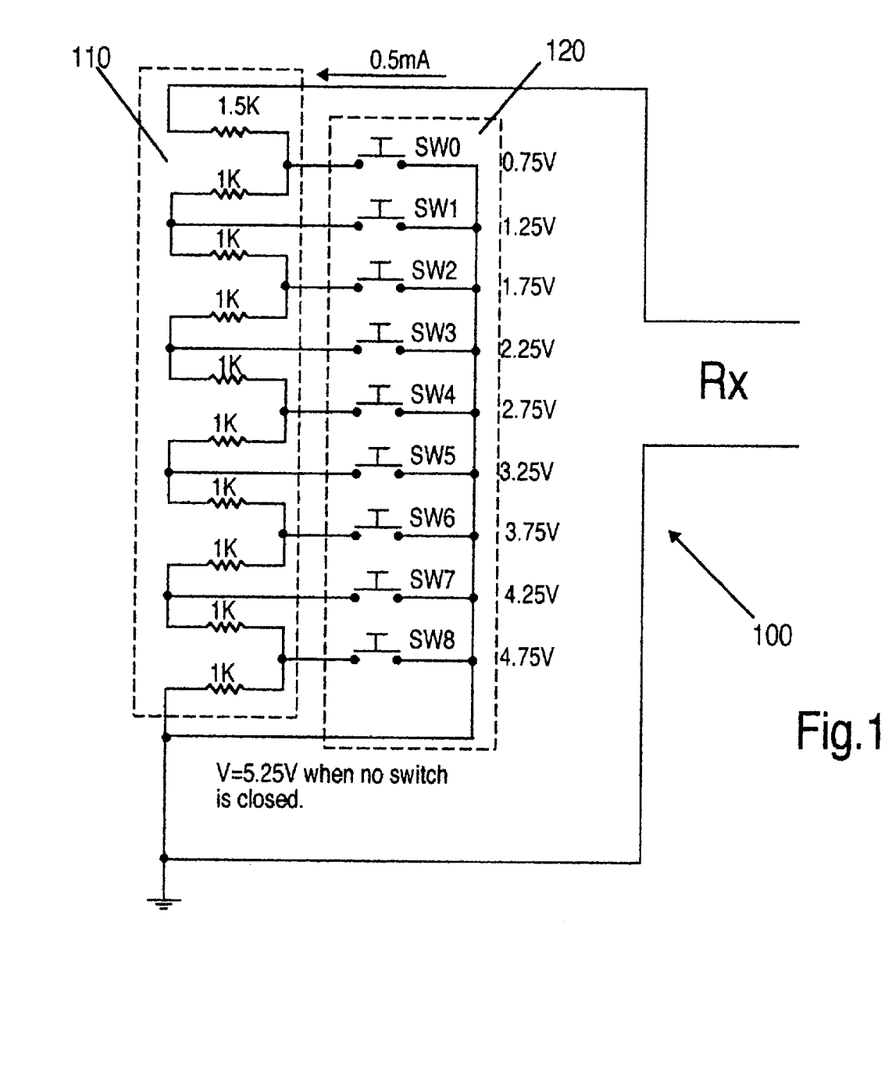
FIG. 1 is a schematic diagram illustrating the transmitter in the multiplexer of the present invention.

FIG. 1 shows a transmitter for a variable resistor and bar graph driver multiplexer 100. The resistor network 110 contains a plurality of resistors connected in series. In this particular example, the resistor network 110 contains ten resistors. All of the resistors except the top resistor have the same value, preferably 1K. The top resistor should have a higher value, about 1.5K. Switch tree 120 contains nine switches SW0 to SW8. These switches are each connected to the junction between two resistors in the resistor network 110, and all of the switches are preferably momentary-contact, normally-open type switches. This type of switch is spring-biased in the open position so that it will automatically return to the open position after it is depressed and released.

For purposes of clarity, an example of the inventive structure will be described using specific current and resistor values. It is to be understood, however, that other values can be used to achieve the same results without departing from the spirit of the invention. In the example shown in FIG. 1, a 0.5 mA constant current source supplies current to the resistor network 110. When all of the switches in switch tree 120 are open, the voltage Vout at an upper terminal of the switch tree 120 will be 5.25V (0.5 mA multiplied by 10.5K). When SW0 is pushed closed, Vout will be 0.75V (0.5 mA*1.5K). The output voltage Vout when other switches are pushed will vary between 0.75V and 5.25V depending on their position in the switch tree 120 and the location of the particular switch connection to the resistor network 110. In this example, as the switch number increases, the supply current will be multiplied by a higher resistance value, thereby increasing the output voltage. For example, when SW1 is pushed, the resistance will be 2.5K and the output voltage will therefore be 1.25 V, but when SW7 is pushed, the resistance will be 8.5K and the resulting output voltage will be 4.75 volts. Since the resistances in the resistor tree 110 preferably have all have the same value, the difference in Vout for adjacent switches will be the same as well. In this example, the difference in Vout for adjacent switches will be 0.5V (e.g. Vout for SW1 is 1.25V, Vout for SW2 is 1.75 V, etc.).

Figure 2:
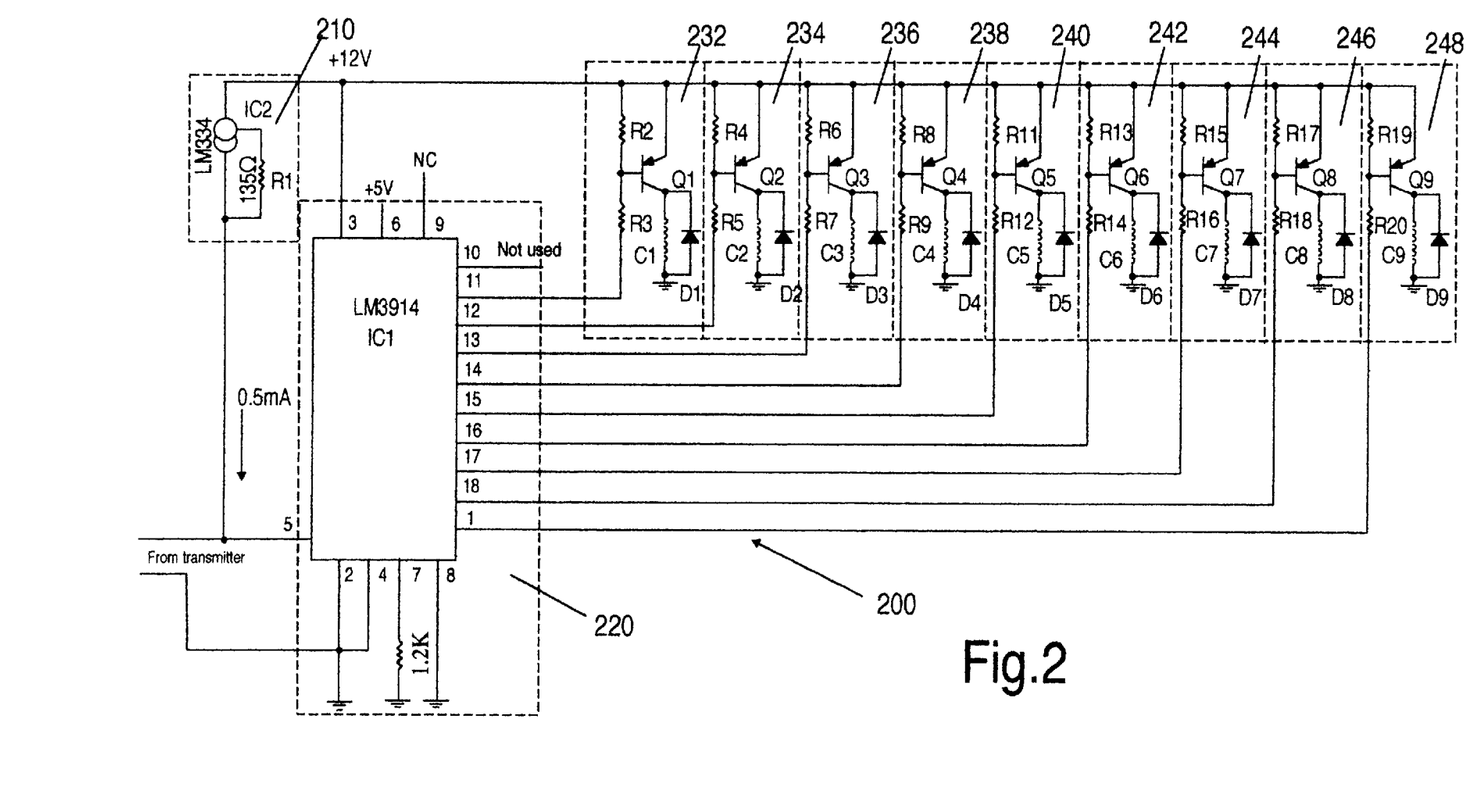
FIG. 2 is a schematic diagram illustrating the receiver in the multiplexer of the present invention.

FIG. 2 illustrates a receiver circuit 200 used in the first embodiment of the present invention. The primary component in the receiver circuit 200 in this embodiment is a bar graph driver operated in dot mode (as opposed to bar graph mode) and used as an analog-to-digital converter. The receiver circuit 200 contains a constant current source 210, the bar graph driver circuit 220, and PNP drivers 232 through 248. The constant current source 210 contains an integrated circuit IC2 and its feedback resistor R1. For example, if a constant current source IC is used with a feedback resistance of 135 ohms, the constant current source will provide a constant current of 0.5 mA to the transmitter regardless of the variable resistance value from the resistor network 110 in the transmitter 100.

As noted above, the bar graph driver 220 shown in the transmitter of FIG. 2 is used as an analog-to-digital converter that can convert a voltage to one of ten. outputs. The bar graph driver 220 used in this particular example is an LM3914 set to work in the dot mode, but any bar graph driver that is commonly used for displaying a voltage in LED bar graph form can be used in the receiver 200. The positive supply of the bar graph driver 220 in this example is pin 3, which is connected to the 12V supply. The high reference for the bar graph driver 220 is on pin 6, which is connected to a 5V supply, and the low reference is on pin 4, which is connected to ground. This makes the internal set points of the bar graph driver 220 in this example range from 0.5V to 5.0V in increasing 0.5V increments (0.5V, 1.0V, 1.5V, etc.).

Pin 7 of the bar graph driver 220 provides a 1.25V reference when pin 8 is grounded. The resistor from pin 7 to ground also sets the amount of current entering the bar graph driver 220 when that particular output lead is turned on. In this case, I=12.5V/1.2K=10.42 mA. This current is pulled from one of the nine PNP drivers 232 through 248 when a switch is pushed. With a nominal gain for a transistor larger than 40 and a relay coil that only needs 100 mA to operate, the base current of any one of the PNP transistors 232 through 248 can be as low as 10.4 mA to operate.

Referring now to one specific PNP driver in FIG. 2, a PNP driver 232 contains PNP transistor Q1 and bias resistor R2, current limiting resistor R3, freewheeling diode D1, and the PNP driver 232 drives a relay coil C1. The other PNP drivers 234 through 248 have the same structure as PNP driver 232 and drive their respective relay coils C2 through C9. The relay coils C1 through C9 are each connected to different output pins on the bar graph driver 20 such that each relay coil C1 through C9 turns on when its corresponding switch SW0 through SW9 is pushed. When one of the switches SW0 through SW9 is pushed, Vin at pin 5 will have a particular voltage value that will fall in between two of the internal set points of the bar graph driver 220. The range in which Vin falls determines which pin in the bar graph driver 220 goes low, thereby determining which one of the transistors, and consequently which one of the relay coils, turns on.

For example, when SW0 is pushed, Vin at pin 5 of the LM3914 will be 0.75 V. Because 0.75V falls between the 1V and 0.5V internal set points, the output pin 1 will be low, turning on transistor Q9 and coil C9. Similarly, when SW1 is pushed, the Vin at pin 5 of the bar graph driver 220 will be 1.25 V. Because 1.25V falls in between the 1.5V and 1.0V internal set points in the bar graph driver 220, output pin 18 will be low and turn on transistor Q8 and coil C8. Further, when SW2 is pushed, Vin at pin 5 of IC will be 1.75V. Because 1.75V falls in between the 2V and 1.5V set points, output pin 17 will be low and turn on transistor Q7 and coil C7. The remaining transistors and coils respond to the remaining switches in generally the same manner and therefore do not need to be explained here.

When all of the switches are open, Vin and pin 10 of the bar graph driver 220 in this example will try to pull down. Because this represents a condition where none of the switches are pushed, the output cannot be used. Thus, this multiplexing system can transmit a total of nine signals using only one pair of wires.

Figure 3:
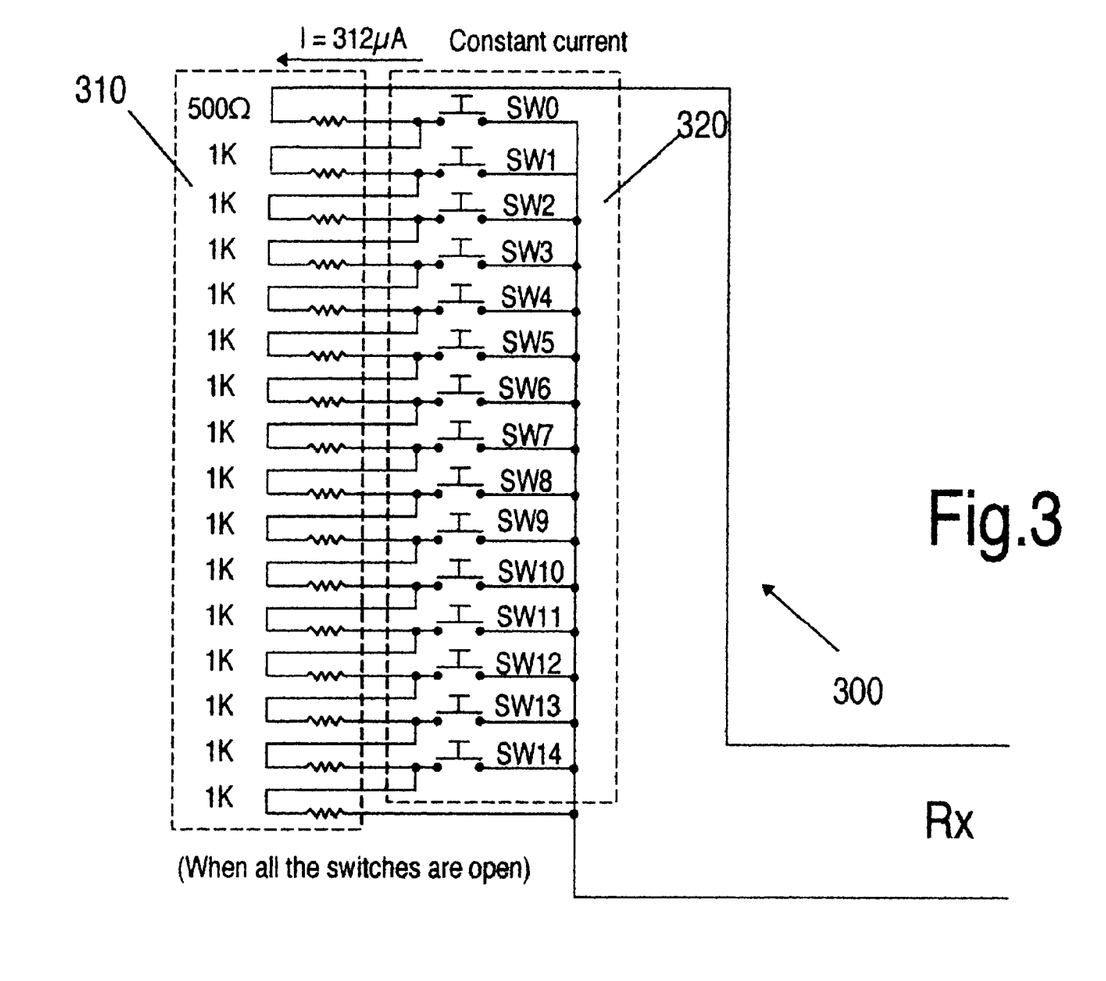
FIG. 3 is a diagram of a transmitter in another embodiment of the multiplexer.
Figure 4:
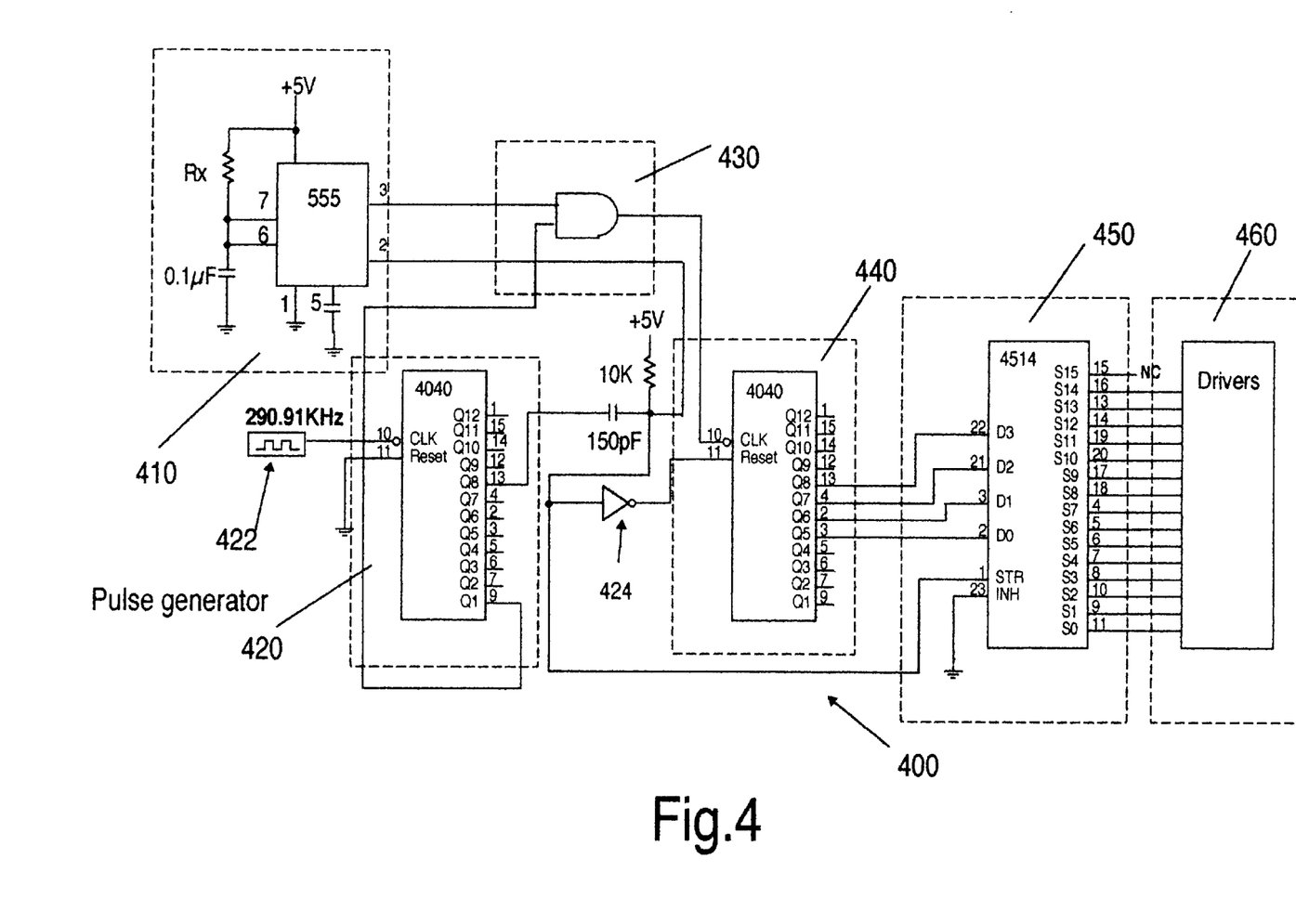
FIG. 4 is a diagram of a receiver in another embodiment of the multiplexer.
Figure 5:
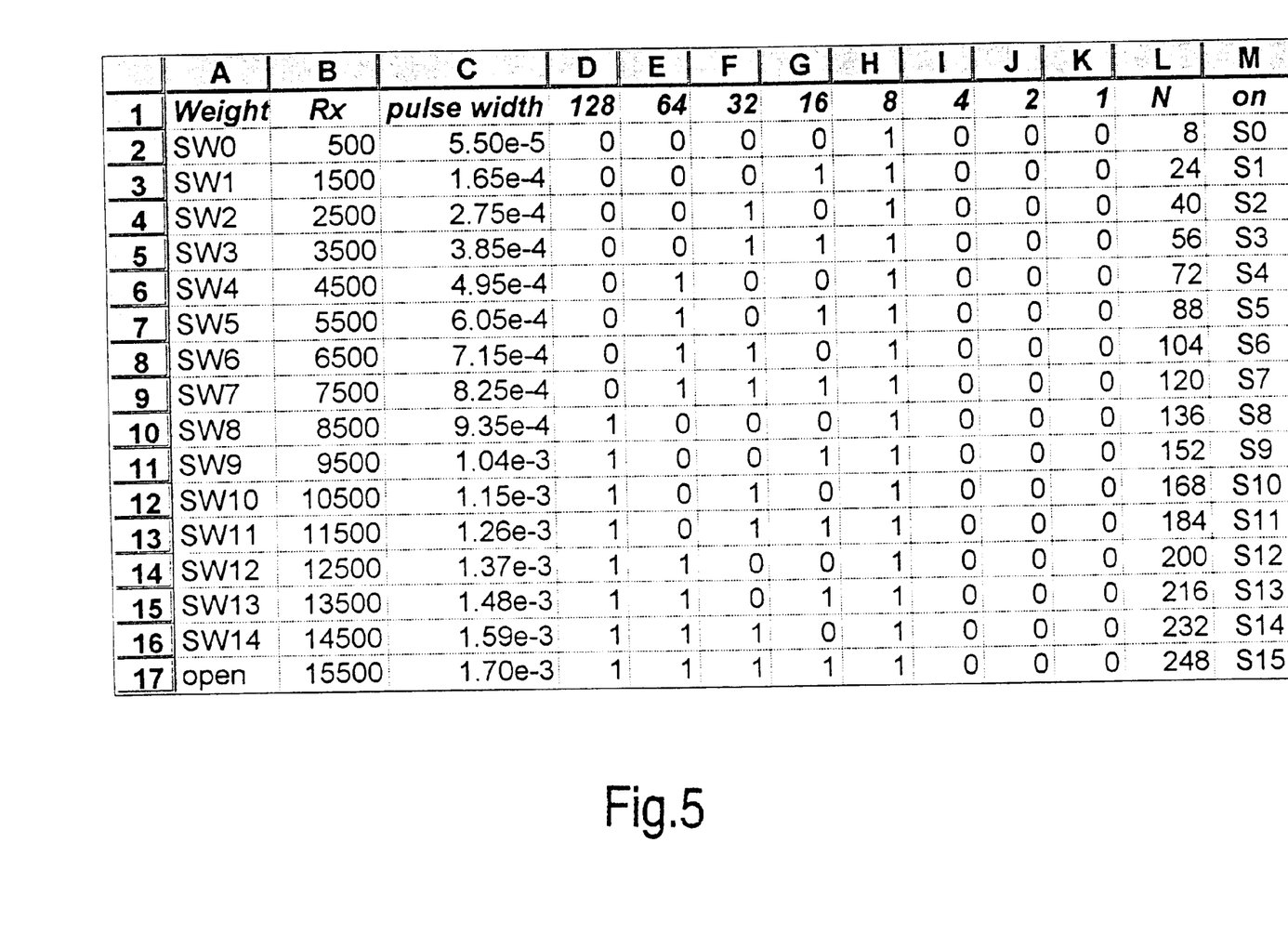
FIG. 5 is a chart listing one example of the calculations associated with the multiplexer of the second embodiment.

FIGS. 3, 4 and 5 describe an alternative embodiment of a transmitter for a variable resistor and one-shot timer multiplexer. FIG. 3 shows a transmitter 300 for this embodiment. This block 300 contains two sub-blocks 310 and 320. Sub-block 310 is a resistor tree having sixteen series-connected resistors. In this example, all of the resistors are 1K resistors except for the first one, which is a 500 ohm resistor. Any other resistor values and resistor combinations can be used, however. Sub-block 320 contains fifteen switches connected with sub-block 310 to control the resistance value Rx. FIG. 5 is a table showing the resistor value Rx associated with each switch in the example shown in FIG. 3. The resistor value Rx in this example ranges from 500 ohms (when SW0 is pushed) to 15,500 ohms (when all of the switches are open) and increases in 1000 ohm increments as the switch number increases (e.g. when SW1 is pushed, Rx=1500 ohms; when SW2 is pushed, Rx=2500 ohms, etc.).

FIG. 4 shows a receiver 400 for use with the transmitter 300 described in FIG. 3. This receiver circuit 400 contains six sub-blocks 410, 420, 430, 440, 450 and 460. Sub-block 410 is a one-shot timer or monostable multivibrator. In this example, a 555 timer is used to build the one-shot timer 410. Every time pin 2 of the 555 timer in sub-block 410 sees a narrow negative going pulse, a one-shot pulse is triggered. The pulse width from pin 3 of the timer T in this example is $T=1.1*Rx*(0.1\ uF)$.

Block 420 is a free running binary counter, preferably using a CMOS CD4040 IC. This counter 420 receives its clock signal from a pulse generator 422. In this example, a frequency of 290.9 kHz is used. The output Q1, which has a frequency $f=290.9\ kHz/2=145.45\ kHz$, is fed to an AND gate in sub-block 430 as the new clock. When the output Q8 of this counter 420 goes from high to low, a narrow negative going pulse is used to retrigger the one shot timer 410 and start a new cycle. This negative-going pulse, after being inverted once in an inverter 424, is used to reset 1 second counter 440. The AND gate 430 acts like a gate that limits the number of pulses that can go through. The number of pulses that can go through depends on the pulse width from the one-shot timer 410.

Sub-block 440 is another binary counter that is used to count the number of pulses that are able to go through the AND gate. In this example, a CD 4040 binary counter is used, but any other binary counter can work as well. Each time the counter 420 Q8 goes from high to low, a generated negative pulse will retrigger the 555 timer 410, reset the timer in the binary counter 440, and latch the four higher bits from the binary counter 440 into a 4-bit transparent latch/4-to-16 line decoder in sub-block 450, which is a CD4514 latch/decoder in this particular example. The latch/decoder's 450 main function is to latch a 4-bit code outputs Q5 though Q8 from the binary counter 440, decode them, and output a high signal depending on the code results. Sub-block 460 is a plurality of drivers that are used to provide more current to drive a relay coil or other power devices.

FIG. 5 is a chart showing the relationship between the particular switch being pushed and the resulting bit pattern in the binary counter 440. As can be seen from the chart, when no switch is pushed at the transmitter, Rx=15,500 ohms, T (the pulse width) is equal to $1.1*(15,500)(0.1\ uF)=1.70\ ms$. The period of the clock from Q1 of counter $420=1/(145.45\ kHz)=6.88\ us$, and N (the number of pulses that can pass through the AND gate)=$1.70\ ms/6.88\ us=248$. The bit pattern of the binary counter 440 in this case will be 1111 1000. In this case, the output S15 of the CD4514 in sub-block 450 will be high and all other outputs will be low. The data for when other switches are depressed are calculated in the same manner, and the results are shown in FIG. 5. Thus, the calculating steps will not be repeated here.

Note that only the four most significant bits are used to determine the output. The four least significant bits of the binary counter 440 are ignored, allowing the device to be constructed with common components having less precise tolerances without sacrificing performance. As a result, this circuit will work reasonably well with readily available off-the-shelf components.

Figure 6:
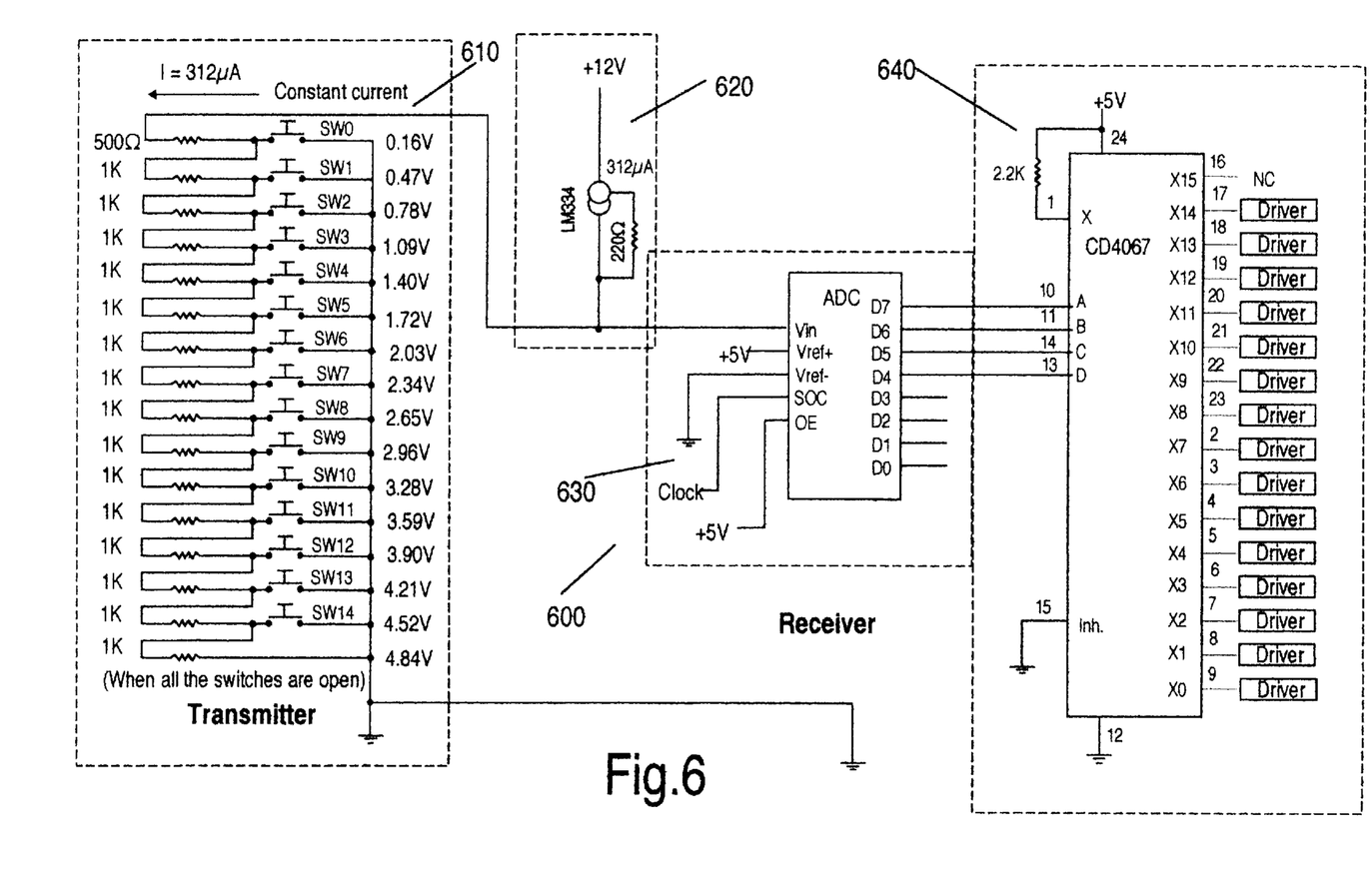
FIG. 6 is a diagram of a third embodiment of the multiplexer using an analog-to-digital converter in the receiver.
Figure 8:
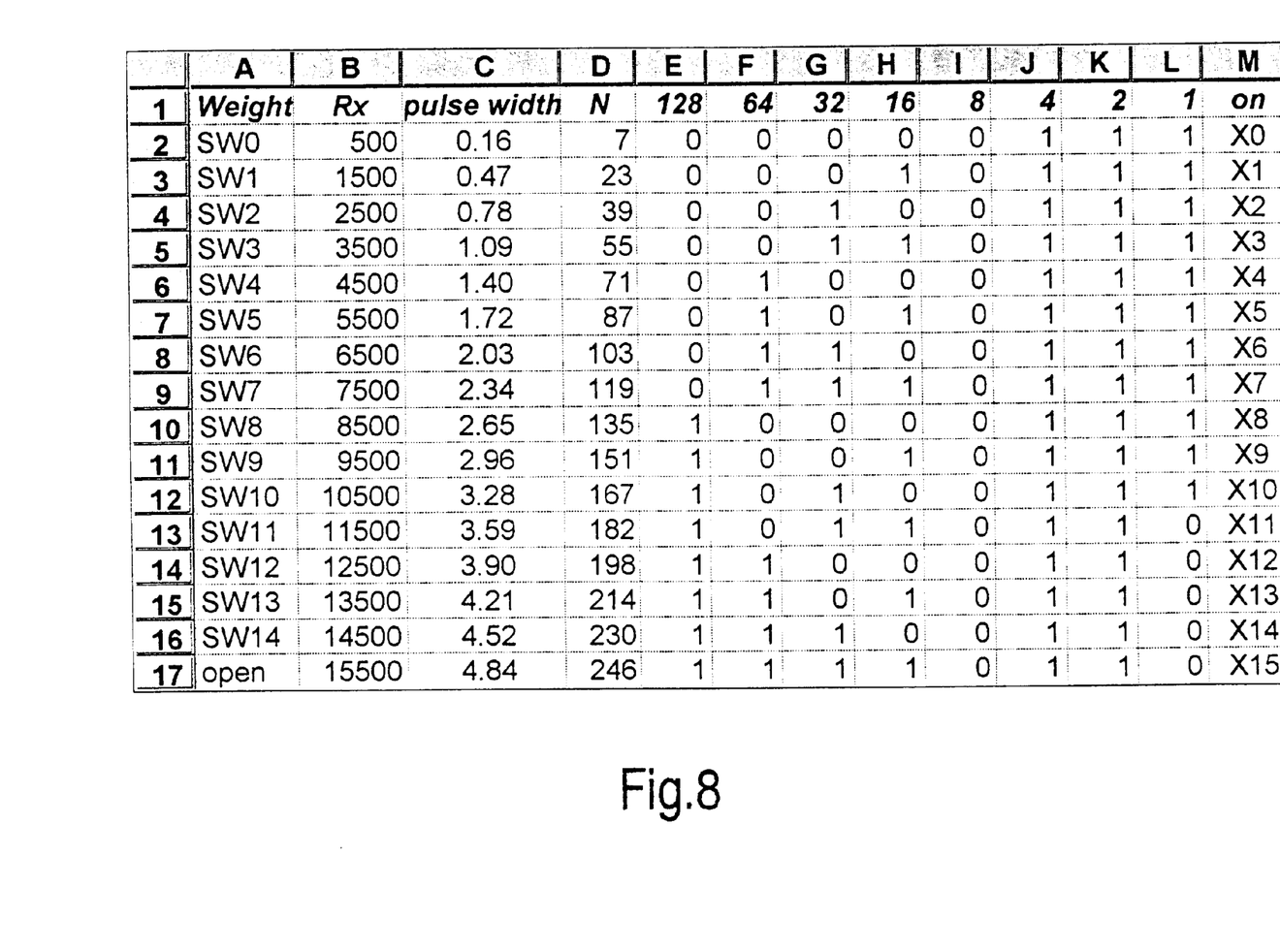
FIG. 8 is a calculation chart associated with the third embodiment.

FIG. 6 illustrates another embodiment of the multiplexer using an analog-to-digital converter in a receiver. A transmitter 610 in this example has sixteen resistors connected in series and fifteen switches each connected to the junction of the resistors at one end and to ground at the other end. Pushing anyone of the switches, which are normally off, will cause one or more of the resistors in the transmitter 610 to short to ground and give a different resistance value Rx at the transmitter 610 output. Assuming a 312 uA constant current source, the Vout when any switch is pushed will equal 312 uA multiplied by the resistance associated with that particular switch, as shown in FIG. 8. For example, when switch SW0 is pushed, Vout will equal (312 uA)*500= 0.16V. Similarly, when SW1 is pushed, Vout=(312 uA)*1500=0.47V. The chart on FIG. 8 lists the Vout values associated with the remaining switches in the transmitter 610 and will therefore not be repeated here.

Constant current source 620 preferably contains an LM334 constant current source and its associated 220 ohm programming resistor. With the 220 ohm resistor, the constant current source 620 will produce a constant current of approximately 312 uA. One end of the constant current source 620 is connected to a +12V supply and the other end is connected to the resistor network, which has a resistance value of Rx, in the transmitter 610. The input voltage Vin is fed to an 8-bit analog-to-digital converter 630. The A/D converter 630 is driven using a clock signal into the SOC or start conversion input. The reference voltage of this A/D converter 630 is preferably around 5V. The outputs D4 through D7 of the A/D converter 630 are fed into terminals D through A, respectively, on an analog multiplexer and de-multiplexer IC 640. Depending upon the 4-bit code received, the multiplexer 640 will connected the X terminal to one of sixteen outputs X0 through X15.

For example, if SW0 is pushed down, the input voltage Vin of the analog-to-digital converter 630 will be 0000 0111. The most significant 4 bits will be 0000. This will cause the X input terminal to connect to X0. The 2.2K resistor that is connected between the +5V source and the X input terminal in the multiplexer/demultiplexer 640 is a current limiting resistor that limits the current output from any one of the sixteen outputs. The outputs of the multiplexer/demultiplexer 640 can then be used to drive a current or voltage amplifier and in turn drive a relay coil or MOSFET output device.

As another example, if SW7 is pushed, Vin of the analog-to-digital converter 630 will be 2.34V. Each bit of the analog-to-digital converter 630 is equal to 5V/255 or 19.61 mV. The number of bits N will equal $2.34V/19.61\ mV=119$. Thus, the output of the analog-to-digital converter 630 will be 0111 0111. The most significant bits in this case is therefore 0111, and this will cause the X input terminal connected to X7 to turn on the driver connected to X7. FIG. 8 lists detailed calculations corresponding to the remaining switches in the preferred embodiment. Of course, other values can be used.

Figure 7:
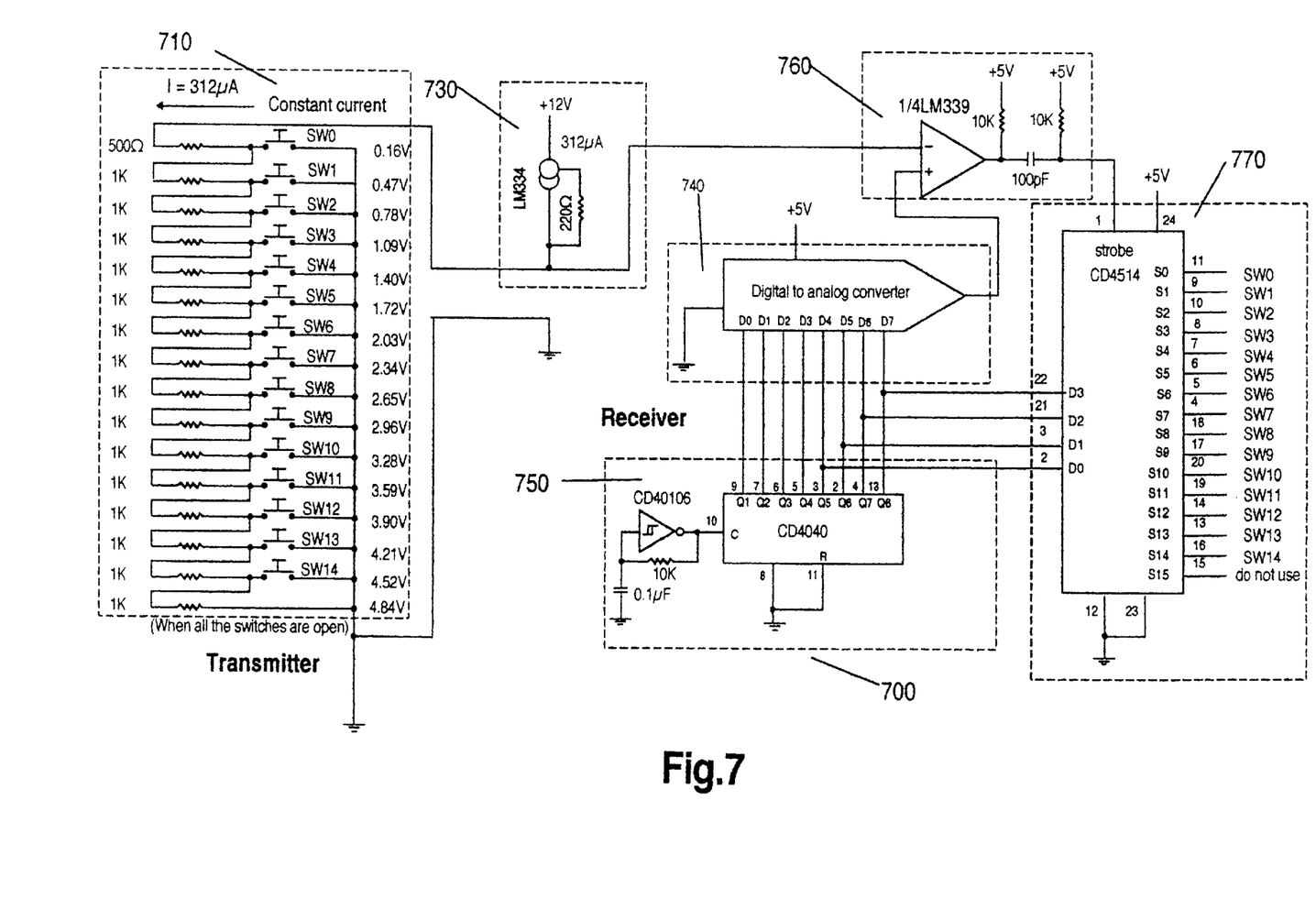
FIG. 7 is a diagram of a fourth embodiment of the multiplexer using a digital-to-analog converter in the receiver.
Figure 9:
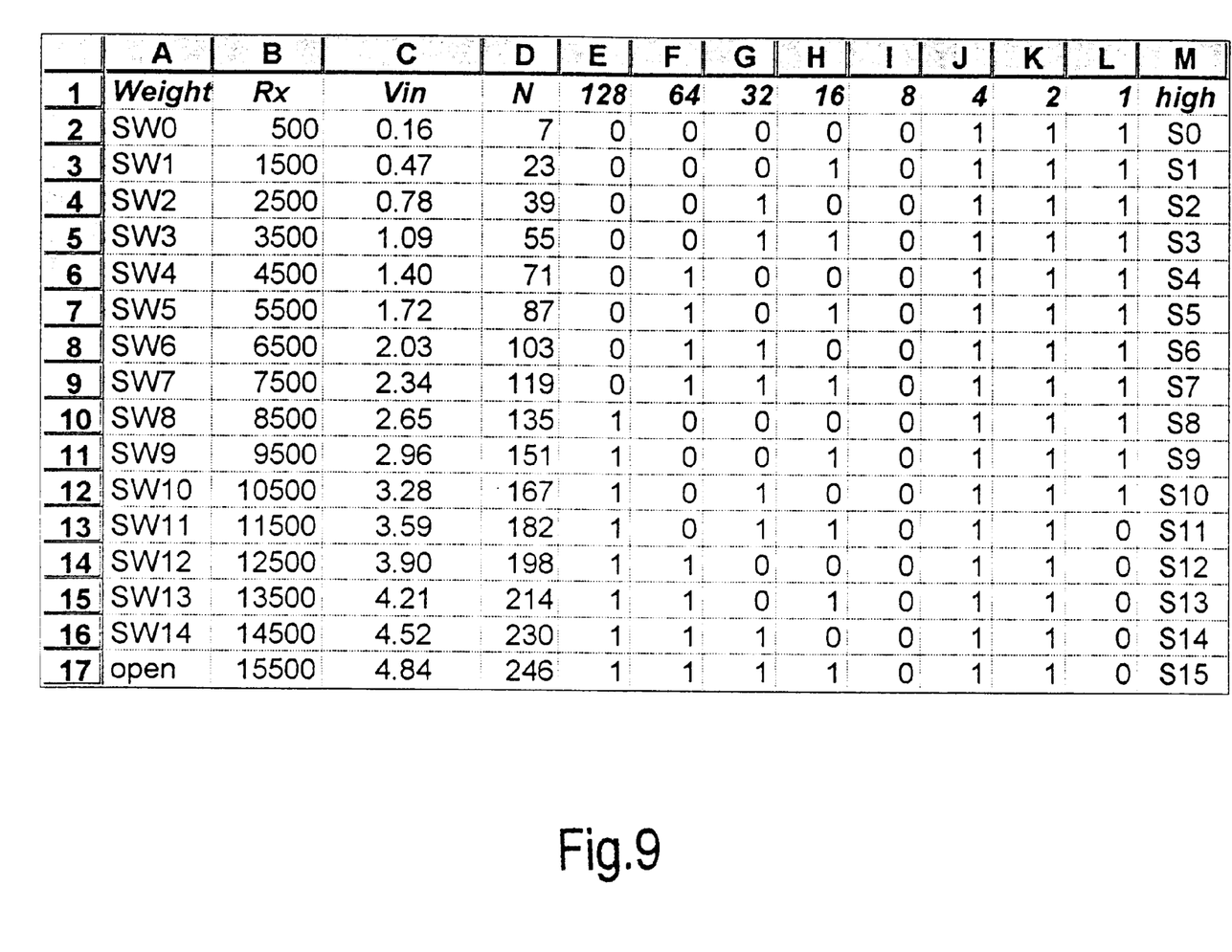
FIG. 9 is a calculation chart associated with the fourth embodiment.

FIG. 7 illustrates another embodiment of the multiplexer of the present invention, this time using a digital-to-analog converter. Block 710 is the transmitter in the multiplexer. Like the transmitter 610 in the previously described embodiment, the transmitter 710 in this embodiment contains sixteen series-connected resistors in a resistor network and fifteen switches each having one side connected to the junction of the resistors and the other side connected to ground. Pushing any one of the switches momentarily will cause one or more of the resistors to short to ground and thus provide a different resistor value corresponding to each switch. The resulting output voltage Vout from the transmitter 710 will be equal to the value of the constant current source multiplied by the resistance corresponding to the switch that is pushed. FIG. 9 is a chart listing the output voltages corresponding to each switch in a circuit where the constant current source I=312 uA and the resistor network in the transmitter 710 has the listed resistor values Rx.

Constant current source 730 is preferably an LM 334 constant current source with its corresponding 220 ohm programming resistor. With the 220 ohm resistor, the constant current source 730 will produce a constant current of approximately 312 uA. One end of the constant current source 730 is connected to a +12V supply and the other end is connected to the resistor network in the transmitter 710. The Vin is fed to the inverting input of a voltage comparator in block 760, which will be described in detail later. The digital-to-analog converter 740 is driven by outputs Q1 through Q8 of a binary ripple counter in a block 750. In block 750 there is also a CD40106 Schmidt-trigger inverter with preferably a 10K resistor and a 0.1 uF capacitor. This part of the circuit is a free-running pulse generator. The output of this generator in the binary ripple counter 750 is used to provide the clocking of the CD4040 binary counter 750. Block 740 is a digital-to-analog IC, preferably with a reference voltage of 5V. In this case, the output from the digital-to-analog converter 740, which is driven by the binary counter 750 outputs, will be a saw tooth wave having an amplitude of 5V. When the output of the binary counter is 0000 0000, the output of the digital-to-analog converter 740 is 0V, while when the output of the binary ripple counter 750 is 1111 1111, the output of the digital-to-analog converter 740 is 5V. In between these two extreme values, the output of the digital-to-analog converter 740 has a linear staircase-type relationship with the binary ripple counter 750 output.

Block 760 contains a voltage comparator, two resistors (preferably 10K resistors) and a 100 pF capacitor. Of course, any other values can be used. The non-inverting input of the comparator in block 760 is connected to the output of the digital-to-analog converter 740, and the inverting input of this comparator 760 is connected to the transmitter voltage. Whenever the non-inverting input voltage exceeds the voltage on the inverting input terminal, the output of the comparator 760 will go low. This will generate a narrow negative-going pulse. This pulse is fed to block 770 at pin 1 of a 4-bit transparent latch/4-to-16 line decoder as a strobe input. The 4 bit address D0, D1, D2, and D3 are connected to the most significant four bits from the CD4040 Q5, Q6, Q7, and Q8, respectively.

FIG. 9 is a chart listing the detailed calculations for the digital-to-analog multiplexer shown in FIG. 7. For example, if SW0 is pushed down, the input voltage Vin of the comparator 760 will see 0.16V. Each bit is equal to 5V/255 or 19.61 mV. The number of bits will be N=0.16V/19.61 mV=7. Thus, the output of the binary ripple counter 750 will be 0000 0111 when the voltage comparator 760 output goes from high to low. This change will send a narrow negative-going pulse to latch the 4 most significant bits, 0000 in this case, into the 4-bit transparent latch/4-to-16 line decoder 770. After decoding, the S5 output of the latch/decoder will be high.

While the best mode for carrying out the invention has been described in detail, those familiar with the art to which the invention relates will recognize various alternative designs and embodiments for practicing the invention without departing from the spirit and scope of the following claims.

I claim:
1. A multiplexer comprising:
   a transmitter for transmitting an output voltage, the transmitter having
   a constant current source,
   a resistor network including a plurality of resistors connected in series, and
   a switch tree including a plurality of switches, each switch connected to a junction between two of said plurality of resistors in said resistor network, wherein each switch is associated with a selected resistance and wherein the output voltage has a selected value corresponding with the selected resistance; and
   a receiver for receiving the output voltage from the transmitter and actuating a plurality of drivers in response to the output voltage from said transmitter such that the selected value of the output voltage determines which driver in said plurality of drivers is actuated.

2. The multiplexer of claim 1, wherein said receiver is a bar graph driver operated as an analog-to-digital converter.

3. The multiplexer of claim 2, wherein said bar graph is operated in a dot mode.

4. The multiplexer of claim 1, wherein said receiver comprises:
   a plurality of drivers, each driver associated with one of said plurality of switches in said transmitter; and
   an analog-to-digital converter for actuating at least one of said plurality of drivers by generating a digital output corresponding to the output voltage from said transmitter and actuating one of said plurality of drivers based on the digital output.

5. The multiplexer of claim 4, wherein said one of said plurality of drivers is actuated based on the most significant bits in the digital output.

6. The multiplexer of claim 1, wherein said receiver comprises:
   a plurality of drivers, each driver associated with one of said plurality of switches in said transmitter; and
   a digital-to-analog converter for actuating at least one of said plurality of drivers by generating a digital output corresponding with the output voltage from said transmitter, generating a corresponding converter output voltage, and actuating one of said plurality of drivers based on the converter output voltage.

* * * * *